US012632058B2

(12) United States Patent
Hashizume et al.

(10) Patent No.: US 12,632,058 B2
(45) Date of Patent: May 19, 2026

(54) RECORDING MEDIUM STORING CONTROL PROGRAM FOR INFORMATION PROCESSING TERMINAL DEVICE, AND MOBILE BODY MANAGEMENT DEVICE

(71) Applicant: NEC Corporation, Tokyo (JP)

(72) Inventors: Daisuke Hashizume, Tokyo (JP); Yumi Tanaka, Tokyo (JP); Takahiro Oba, Tokyo (JP); Mitsuyuki Kondo, Tokyo (JP); Hiroaki Yoshida, Tokyo (JP); Iwao Ishida, Tokyo (JP); Hiroyuki Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 25 days.

(21) Appl. No.: 18/702,367

(22) PCT Filed: Dec. 2, 2021

(86) PCT No.: PCT/JP2021/044215
§ 371 (c)(1),
(2) Date: Apr. 18, 2024

(87) PCT Pub. No.: WO2023/100306
PCT Pub. Date: Jun. 8, 2023

(65) Prior Publication Data
US 2024/0411315 A1     Dec. 12, 2024

(51) Int. Cl.
*G05D 1/224* (2024.01)
*G05D 1/69* (2024.01)
(Continued)

(52) U.S. Cl.
CPC ............. *G05D 1/2247* (2024.01); *G05D 1/69* (2024.01); *G05D 2109/20* (2024.01); *G05D 2111/10* (2024.01)

(58) Field of Classification Search
CPC .... G05D 1/2247; G05D 1/69; G05D 2109/20; G05D 2111/10; G05D 1/226;
(Continued)

(56) References Cited

U.S. PATENT DOCUMENTS 10,880,465 B1 *  12/2020  Svendsen ............... G06Q 50/01
11,927,452 B2 *   3/2024  Yuki .................... G01C 21/343
(Continued)

FOREIGN PATENT DOCUMENTS

CN      111985662 A    11/2020
JP      2019-197525 A  11/2019
(Continued)

OTHER PUBLICATIONS

Machine translation of CN111985662A retrieved from Espacenet on Aug. 9, 2025 (Year: 2025).*
(Continued)

*Primary Examiner* — Thomas Ingram
(74) *Attorney, Agent, or Firm* — Sughrue Mion, PLLC

(57) ABSTRACT

A control program for an information processing terminal device causes an information processing terminal device to execute: an identification information reception process for receiving mobile body identification information which has been transmitted from a mobile body, from which the mobile body is identifiable, and which indicates a state of the mobile body; and an identification information transmission process for transmitting the received mobile body identification information to a mobile body management device that manages the mobile body. Thus, it is possible to comprehensively ascertain the operational status of a large number of mobile bodies in various locations in order to accurately manage operation of the mobile bodies.

11 Claims, 4 Drawing Sheets

(51) Int. Cl.
G05D 109/20 (2024.01)
G05D 111/10 (2024.01)

(58) Field of Classification Search
CPC ................ G05D 1/225; G05D 1/6987; G05D 2109/254; G06Q 50/10; G08G 5/00
See application file for complete search history.

(56) References Cited

U.S. PATENT DOCUMENTS

| | | | | |
|---|---|---|---|---|
| 12,012,301 | B2 * | 6/2024 | Machida | G05D 1/0291 |
| 2002/0130814 | A1 * | 9/2002 | Smith | G08G 5/22 342/465 |
| 2018/0375568 | A1 * | 12/2018 | De Rosa | G08G 5/34 |
| 2020/0312159 | A1 * | 10/2020 | Hegranes | G08G 5/22 |
| 2020/0312165 | A1 * | 10/2020 | Hegranes | G01S 13/862 |
| 2024/0338026 | A1 * | 10/2024 | Shoeb | G05D 1/6445 |
| 2024/0419180 | A1 * | 12/2024 | Hammond | G06T 7/74 |

FOREIGN PATENT DOCUMENTS

| | | | |
|---|---|---|---|
| JP | 2020-071724 | A | 5/2020 |
| JP | 2021-170324 | A | 10/2021 |
| WO | 2020/170332 | A1 | 8/2020 |

OTHER PUBLICATIONS

Machine translation of JP2019197525A retrieved from Espacenet on Aug. 9, 2025 (Year: 2025).*

Machine translation of JP2020071724A retrieved from Espacenet on Aug. 9, 2025 (Year: 2025).*

International Search Report for PCT Application No. PCT/JP2021/044215, mailed on Feb. 15, 2022.

English translation of Written opinion for PCT Application No. PCT/JP2021/044215, mailed on Feb. 15, 2022.

* cited by examiner

Fig.2

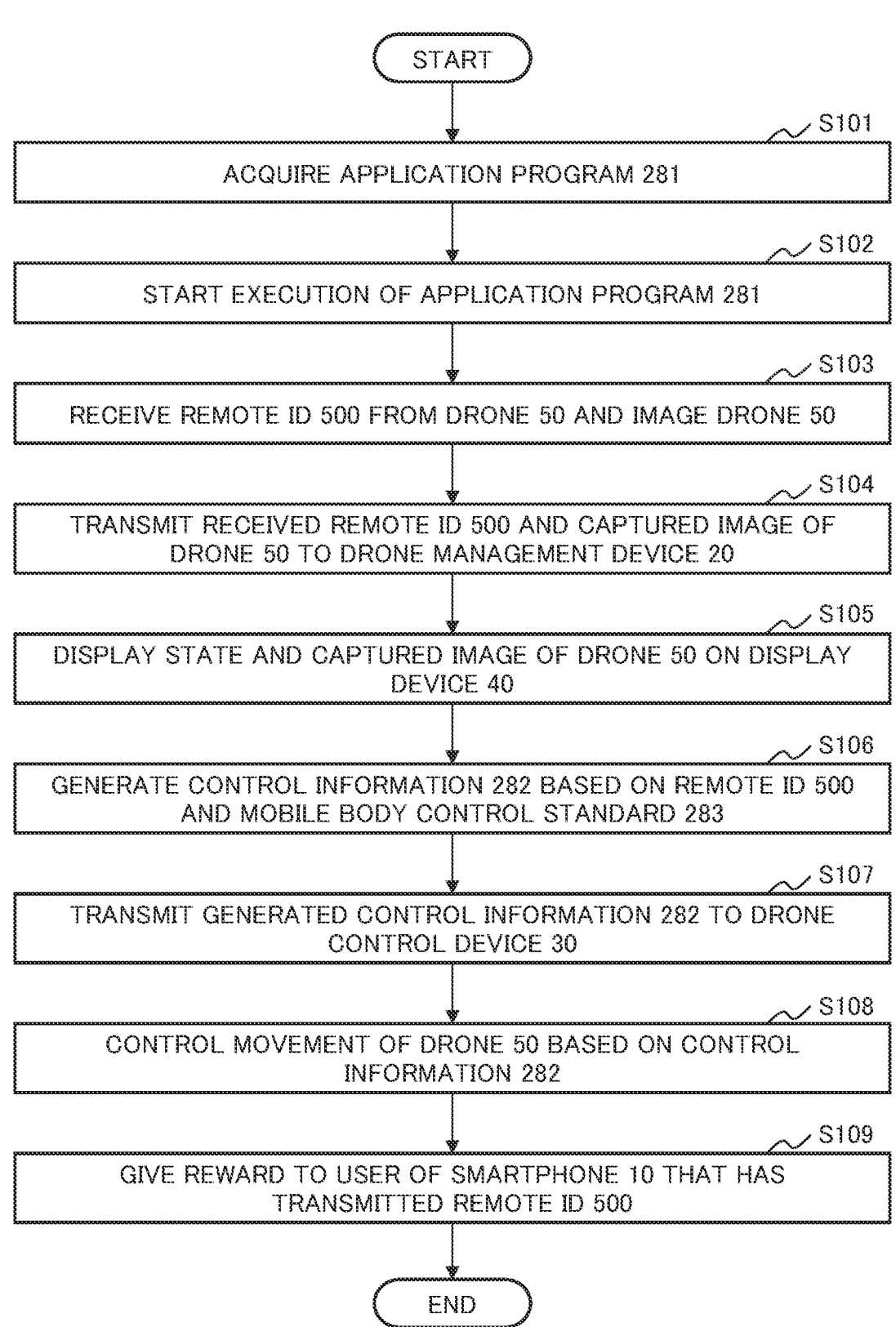

START

S101
ACQUIRE APPLICATION PROGRAM 281

S102
START EXECUTION OF APPLICATION PROGRAM 281

S103
RECEIVE REMOTE ID 500 FROM DRONE 50 AND IMAGE DRONE 50

S104
TRANSMIT RECEIVED REMOTE ID 500 AND CAPTURED IMAGE OF DRONE 50 TO DRONE MANAGEMENT DEVICE 20

S105
DISPLAY STATE AND CAPTURED IMAGE OF DRONE 50 ON DISPLAY DEVICE 40

S106
GENERATE CONTROL INFORMATION 282 BASED ON REMOTE ID 500 AND MOBILE BODY CONTROL STANDARD 283

S107
TRANSMIT GENERATED CONTROL INFORMATION 282 TO DRONE CONTROL DEVICE 30

S108
CONTROL MOVEMENT OF DRONE 50 BASED ON CONTROL INFORMATION 282

S109
GIVE REWARD TO USER OF SMARTPHONE 10 THAT HAS TRANSMITTED REMOTE ID 500

END

RECORDING MEDIUM STORING CONTROL PROGRAM FOR INFORMATION PROCESSING TERMINAL DEVICE, AND MOBILE BODY MANAGEMENT DEVICE

This application is a National Stage Entry of PCT/JP2021/044215 filed on Dec. 2, 2021, the contents of all of which are incorporated herein by reference, in their entirety.

TECHNICAL FIELD

The present invention relates to a recording medium storing a control program for an information processing terminal device, and a mobile body management device.

BACKGROUND ART

In recent years, equipment (hereinafter referred to as a mobile body in the present application) that can be moved automatically or by operation by a person, such as a drone or a robot, has been used in various scenes. In addition, various techniques for managing the operation of such a mobile body have been developed.

As a technique related to such a technique, PTL 1 discloses an unmanned flying device that flies based on instruction information acquired from an external device. This device stores a device identification (ID) for identifying the host device. The device authenticates that the instruction information is proper based on the acquired instruction information and the registered operator ID stored in the recording medium. Then, on condition that the instruction information is determined to be appropriate, the device flies based on the instruction information within an operable range determined by the relationship between the registered operator ID and the device ID.

CITATION LIST

Patent Literature

PTL 1: WO 2020/170332 A1

SUMMARY OF INVENTION

Technical Problem

Recently, with a decrease in the price of a mobile body such as a drone, anyone can easily obtain a drone and fly the drone, and a large number of drones are flying at various places. One of the mechanisms for accurately managing the flight status of such a large number of drones is, for example, a remote ID. The remote ID is a mechanism for remotely collecting identification information transmitted from the drone by transmitting information (including a registration symbol, a manufacturing number, position information, time, and the like) that is capable of identifying the body from the drone. The remote ID is usually collected by a specific device (hereinafter, may be referred to as a remote identification terminal) that can collect the remote ID and is possessed by a specific person such as a police officer, a security guard, or an administrator of an important facility.

However, as described above, when identification information such as a remote ID is collected by a specific device such as a remote identification terminal owned by a specific person, it is difficult to comprehensively grasp an operation status of the mobile bodies such as a huge number of drones used in various places, and it is difficult to accurately perform operation management of the mobile bodies. PTL 1 does not particularly mention this problem.

A main object of the present invention is to comprehensively grasp an operation status of a large number of mobile bodies in various places in such a way as to accurately perform operation management of the mobile body.

Solution to Problem

A control program for an information processing terminal according to an aspect of the present invention causes the information processing terminal device to execute an identification information reception process of receiving mobile body identification information that is capable of identifying a mobile body and indicates a state of the mobile body, the mobile body identification information being transmitted from the mobile body, and an identification information transmission process of transmitting the received mobile body identification information to a mobile body management device that manages the mobile body.

Furthermore, the present invention can also be achieved by a non-volatile computer-readable recording medium storing the control program (computer program) of the information processing terminal.

Advantageous Effects of Invention

According to the present invention, it is possible to obtain a control program of an information processing terminal device capable of comprehensively grasping an operation status of a large number of mobile bodies in various places in order to accurately perform operation management of the mobile body.

BRIEF DESCRIPTION OF DRAWINGS

FIG. 2 is a flowchart illustrating an operation of the drone management system 1 according to the first example embodiment of the present invention.

EXAMPLE EMBODIMENT

Hereinafter, example embodiments of the present invention will be described in detail with reference to the drawings.

First Example Embodiment

Figure 1:
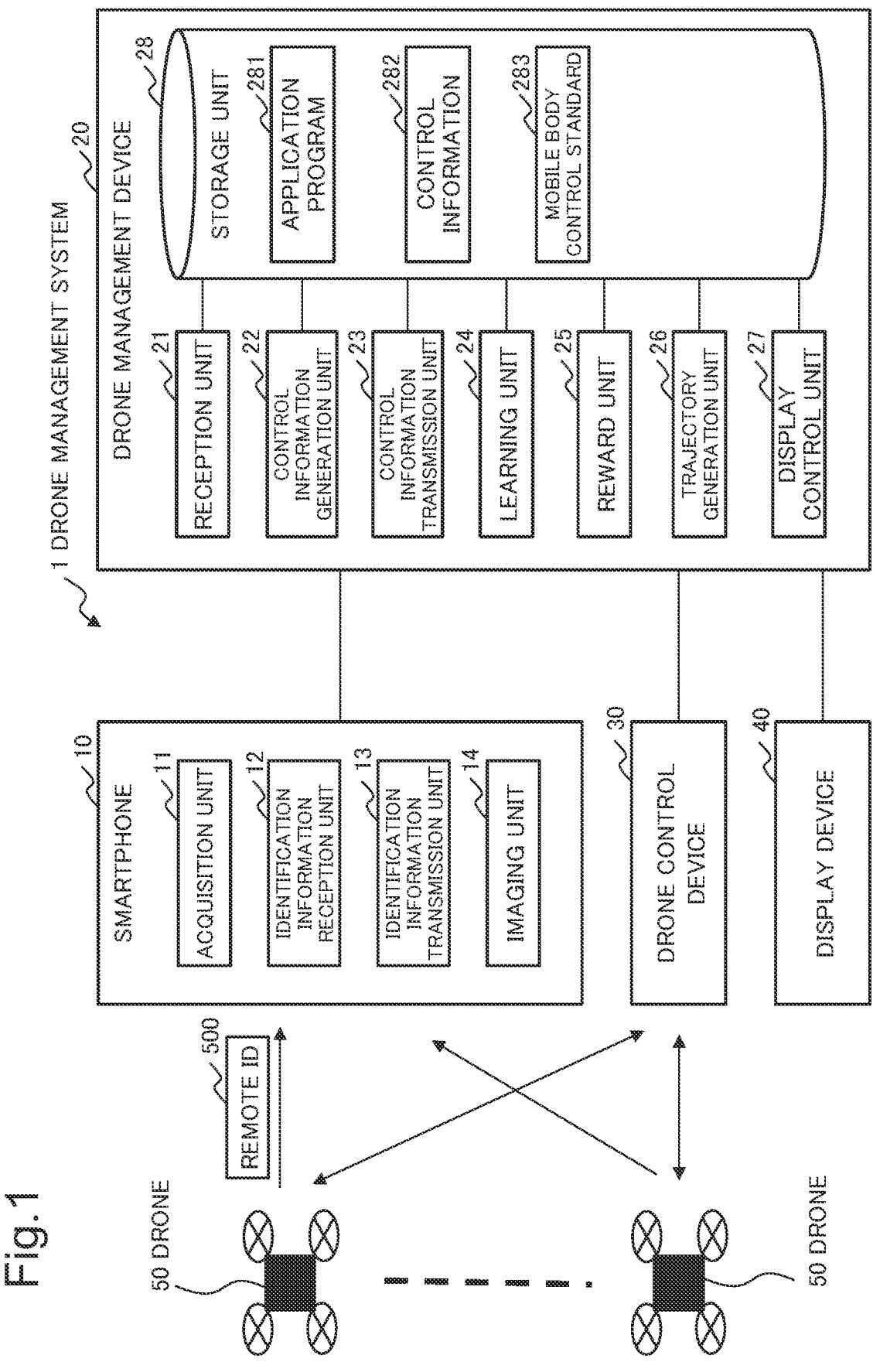
FIG. 1 is a block diagram illustrating a configuration of a drone management system 1 according to the first example embodiment of the present invention.

FIG. 1 is a block diagram illustrating a configuration of a drone management system 1 according to the first example embodiment of the present invention. The drone management system 1 according to the present example embodiment is a system that manages the operation status of one or more drones 50 (an example of a mobile body) to be managed.

It is assumed that the drone 50 transmits (transmits) a remote ID 500. The remote ID 500 is information that is capable of identifying the drone 50 as described above, and includes, for example, a registration symbol, a manufacturing number, position information, time, and the like. Note that the information included in the remote ID 500 is not limited to the above-described information, and may include, for example, information indicating the state of the drone 50.

The drone management system roughly includes a smartphone 10, a drone management device 20, a drone control device 30, and a display device 40. The smartphone 10, the drone management device 20, and the drone control device 30 are an example of an information processing terminal device, a mobile body management device, and a mobile body control device in order. The smartphone 10, the drone control device 30, and the display device 40 are communicably connected to the drone management device 20 via, for example, a wireless or wired communication network.

The smartphone 10 is a general-purpose information processing terminal device, and includes an acquisition unit 11, an identification information reception unit 12, an identification information transmission unit 13, and an imaging unit 14. The identification information reception unit 12, the identification information transmission unit 13, and the imaging unit 14 are an example of an identification information reception process, an identification information transmission process, and an imaging means in order. The imaging unit 14 is, for example, a camera capable of imaging the drone 50 and the like.

The acquisition unit 11 acquires an application program 281 from the drone management device 20, for example. The acquisition unit 11 may acquire the application program 281 from a device different from the drone management device 20.

Application program 281 is software that enables smartphone 10 to operate as a remote identification terminal that is a device capable of collecting the remote ID 500. The application program 281 is an example of a control program of the information processing terminal device. That is, the smartphone 10 operates as the remote identification terminal by executing the application program 281 acquired by the acquisition unit 11.

Identification information reception unit 12 executes the application program 281 to receive the remote ID 500 transmitted from the drone 50. However, it is assumed that the drone 50 transmits the remote ID 500 using a communication method (for example, Bluetooth (registered trademark) or the like) receivable by the smartphone 10.

The identification information transmission unit 13 executes the application program 281 to transmit the remote ID 500 received by the identification information reception unit 12 to the drone management device 20 that manages the drone 50. The identification information transmission unit 13 may attach a captured image in which the drone 50 is imaged by the imaging unit 14 to the remote ID 500 to transmit the captured image to the drone management device 20. The identification information transmission unit 13 may also transmit the remote ID 500 and the captured image in which the drone 50 is imaged to the drone management device 20, for example, by posting them on a social networking service (SNS).

The drone management device 20 is an information processing device such as a server, and includes a reception unit 21, a control information generation unit 22, a control information transmission unit 23, a learning unit 24, a reward unit 25, a trajectory generation unit 26, a display control unit 27, and a storage unit 28. The control information generation unit 22, the control information transmission unit 23, the learning unit 24, the reward unit 25, the trajectory generation unit 26, and the display control unit 27 are an example of a control information generation means, a control information transmission means, a learning means, a reward means, a trajectory generation means, and a display control means in this order.

The storage unit 28 is, for example, a storage device such as a random access memory (RAM) or a hard disk 904 described later with reference to FIG. 4. In addition to the application program 281 described above, the storage unit 28 stores control information 282 and a mobile body control standard 283 to be described later.

The reception unit 21 receives the remote ID 500 transmitted by the identification information transmission unit 13 of the smartphone 10 as described above and the captured image in which the drone 50 is imaged. The reception unit 21 may directly receive the remote ID 500 and the captured image in which the drone 50 is imaged from the smartphone 10, or may acquire the remote ID 500 posted on the SNS from the smartphone 10 and the captured image in which the drone 50 is imaged. The reception unit 21 may also store the remote ID 500 and the captured image in which the drone 50 is imaged in the storage unit 28.

The control information generation unit 22 generates the control information 282 for controlling the movement of each drone 50 based on the remote IDs 500 related to the plurality of drones 50 and the mobile body control standard 283. The mobile body control standard 283 is a standard (information) indicating a relationship between the remote ID 500 and the control information 282 for suitably controlling the movements of the plurality of drones 50. For example, in a case where the remote IDs 500 related to a plurality of drones 50 indicate that mutual positional relationships are close (that is, there is a possibility of collision), the mobile body control standard 283 indicates that the directions in which the individual drones 50 move are determined so as not to collide with each other.

The mobile body control standard 283 may be, for example, a standard given by the administrator of the drone management device 20. Alternatively, the mobile body control standard 283 may be a learning model generated or updated by the learning unit 24 learning the relationship between the remote ID 500 and the control information 282.

The control information transmission unit 23 transmits the control information 282 generated by the control information generation unit 22 as described above to the drone control device 30 that controls the movement of the drone 50. The drone control device 30 may be a device that automatically controls the flight of the drone 50, or may be a controller that receives an input operation by an operator who operates the drone 50. However, in a case where the drone control device 30 is the controller, the drone control device 30 transmits the remote ID 500 of the drone 50 to be operated to the drone management device 20.

In a case where the drone control device 30 is a device that automatically performs flight control of the drone 50, the control information generation unit 22 generates the control information 282 in a data format that enables the drone control device 30 to perform flight control of the drone 50. In this case, the drone control device 30 may be included in the drone management device 20.

In a case where the drone control device 30 is a controller that receives an input operation by the operator operating the drone 50, the control information generation unit 22 generates the control information 282 instructing the input operation. In this case, the drone control device 30 may display the control information 282 received from the drone management device 20 on a display screen (not illustrated) included in the drone control device.

The reward unit 25 gives a reward such as a bonus point to the user indicated by the user identification information that is received together with the remote ID 500 from the smartphone 10 and is capable of identifying the user of the smartphone 10. However, it is assumed that a function of managing a reward such as a bonus point for each user of the smartphone 10 is provided in the drone management device 20 or another device communicable with the drone management device 20.

The trajectory generation unit 26 obtains the temporal transition of the position of the drone 50 represented by the remote ID 500 from the temporal transition of the remote ID 500 received at a certain time interval, for example, to generate the trajectory of the movement of the drone 50. The trajectory generation unit 26 may also identify the position of the drone 50 indicated by the remote ID last received by the smartphone 10 as a candidate for the location where the drone 50 is present with respect to the drone 50 in the missing state.

The display control unit 27 displays the state such as the position and movement of the drone 50 indicated by the received remote ID 500 on the display device 40 visually recognizable by the administrator who manages the operation status of the drone 50. The display control unit 27 may display, on the display device 40, the captured image in which the drone 50 is imaged, the captured image being received together with the remote ID 500. The display control unit 27 may also display the trajectory of the movement of the drone 50 generated by the trajectory generation unit 26 on the display device 40.

Next, the operation (processing) of the drone management system 1 according to the present example embodiment will be described in detail with reference to the flowchart of FIG. 2.

The acquisition unit 11 of the smartphone 10 acquires the application program 281 stored in the storage unit 28 of the drone management device 20 (step S101). The smartphone 10 starts execution of the application program 281 acquired by the acquisition unit 11 (step S102).

The identification information reception unit 12 of the smartphone 10 receives the remote ID 500 from the drone 50, and the imaging unit 14 images the drone 50 (step S103). The identification information transmission unit 13 of the smartphone 10 transmits the remote ID 500 received by the identification information reception unit 12 and the captured image in which the drone 50 is imaged by the imaging unit 14 to the drone management device 20 (step S104).

The display control unit 27 of the drone management device 20 displays the state of the drone 50 indicated by the remote ID 500 received by the reception unit 21 and the captured image in which the drone 50 is imaged on the display device 40 (step S105). The control information generation unit 22 of the drone management device 20 generates the control information 282 based on the received remote ID 500 and the mobile body control standard 283 stored in the storage unit 28 (step S106).

The control information transmission unit 23 of the drone management device 20 transmits the control information 282 generated by the control information generation unit 22 to the drone control device 30 (step S107). The drone control device 30 controls the movement of the drone 50 based on the control information 282 received from the drone management device 20 (step S108). The reward unit 25 of the drone management device 20 gives a reward such as a bonus point to the user of the smartphone 10 that has transmitted the remote ID 500 to the drone management device 20 (step S109), and the entire process ends.

The application program 281 (control program of the information processing terminal device) executed by the smartphone 10 according to the present example embodiment can achieve comprehensive grasping of operation statuses of a large number of drones 50 in various places in order to accurately perform operation management of the drones 50 (mobile bodies). This is because the smartphone 10, which is a general-purpose information processing terminal device, executes the application program 281 to receive the remote ID 500 (mobile body identification information) from the drone 50 to transmit remote ID 500 to the drone management device 20 (mobile body management device).

Hereinafter, effects achieved by the smartphone 10 according to the present example embodiment will be described in detail.

Recently, with a decrease in the price of a mobile body such as a drone, anyone can easily obtain a drone and fly the drone, and many drones are flying in various places. One of the mechanisms for accurately managing the flight status of such a large number of drones is, for example, a remote ID. The remote ID is usually collected by a specific device capable of collecting the remote ID, the specific device being possessed by a specific person such as a police officer, a security guard, or an administrator of an important facility. However, when identification information such as a remote ID is collected by a specific device such as a remote identification terminal owned by a specific person, there is a problem that it is difficult to comprehensively grasp operation statuses of mobile bodies such as a huge number of drones used in various places, and it is difficult to accurately perform operation management of the mobile bodies.

In order to cope with such a problem, the application program 281 according to the present example embodiment causes the smartphone 10 to implement the identification information reception unit 12 and the identification information transmission unit 13, and operates as described above with reference to FIGS. 1 and 2, for example. That is, the identification information reception unit 12 receives the remote ID 500 that is capable of identifying the drone 50 and indicates the state of the drone 50, the remote ID being transmitted from the drone 50. Then, the identification information transmission unit 13 transmits the received remote ID 500 to the drone management device 20 that manages the drone 50.

That is, the application program 281 according to the present example embodiment causes the smartphone 10 to operate as a remote identification terminal that is a device capable of collecting the remote ID 500. As a result, it is possible to collect the remote ID 500 from the drone 50 not only via the dedicated remote identification terminal possessed by a specific person such as a police officer, a security guard, or an administrator of an important facility but also via the smartphone 10 possessed by a general person, and thus, the application program 281 can achieve comprehensive grasping of operation statuses of a large number of drones 50 in various places.

The drone management device 20 according to the present example embodiment generates the control information 282 based on the remote IDs 500 comprehensively collected by a large number of smartphones 10 and the mobile body control standard 283 to transmit the generated control information 282 to the drone control device 30 that controls the movement of the drone 50. Therefore, the drone management system 1 according to the present example embodiment can accurately control the movement of the drone 50.

The drone management device 20 according to the present example embodiment generates or updates the mobile body control standard 283 by learning the relationship between the remote ID 500 and the control information 282. As a result, the drone management system 1 can gradually increase the accuracy of accurately controlling the drone 50.

The drone management device 20 according to the present example embodiment gives a reward such as a bonus point to the user indicated by the user identification information capable of identifying the user of the smartphone 10, the user identification information being received together with the remote ID 500 from the smartphone 10. That is, since the drone management system 1 motivates the user of the smartphone 10 to operate the smartphone 10 to collect the remote ID 500 from the drone 50, it is possible to more comprehensively grasp the operation status of a large number of drones 50.

The drone management device 20 according to the present example embodiment generates the trajectory of the movement of the drone 50 from the temporal transition of the remote ID 500. Then, regarding the drone 50 in the missing state, the drone management device 20 identifies the position indicated by the remote ID 500 last received by the smartphone 10 as a candidate for the location where the drone 50 is present. As a result, the drone management system 1 can more accurately manage the movement of the drone 50 and efficiently search for the missing drone 50.

The information that is capable of identifying the drone 50 collected by the smartphone 10 is not limited to the remote ID 500. The smartphone 10 may collect information that is capable of identifying the drone 50 having a specification different from the remote ID 500.

The drone management system 1 may include a general-purpose information processing terminal device such as a tablet terminal or a personal computer instead of the smartphone 10.

The drone management system 1 (mobile body management system) may manage a mobile body other than the drone 50. The drone management system 1 may manage, for example, a movable robot, a bicycle or an electric scooter having a function of transmitting identification information, an animal to which an oscillator for transmitting identification information is attached, and the like.

Second Example Embodiment

Figure 3:
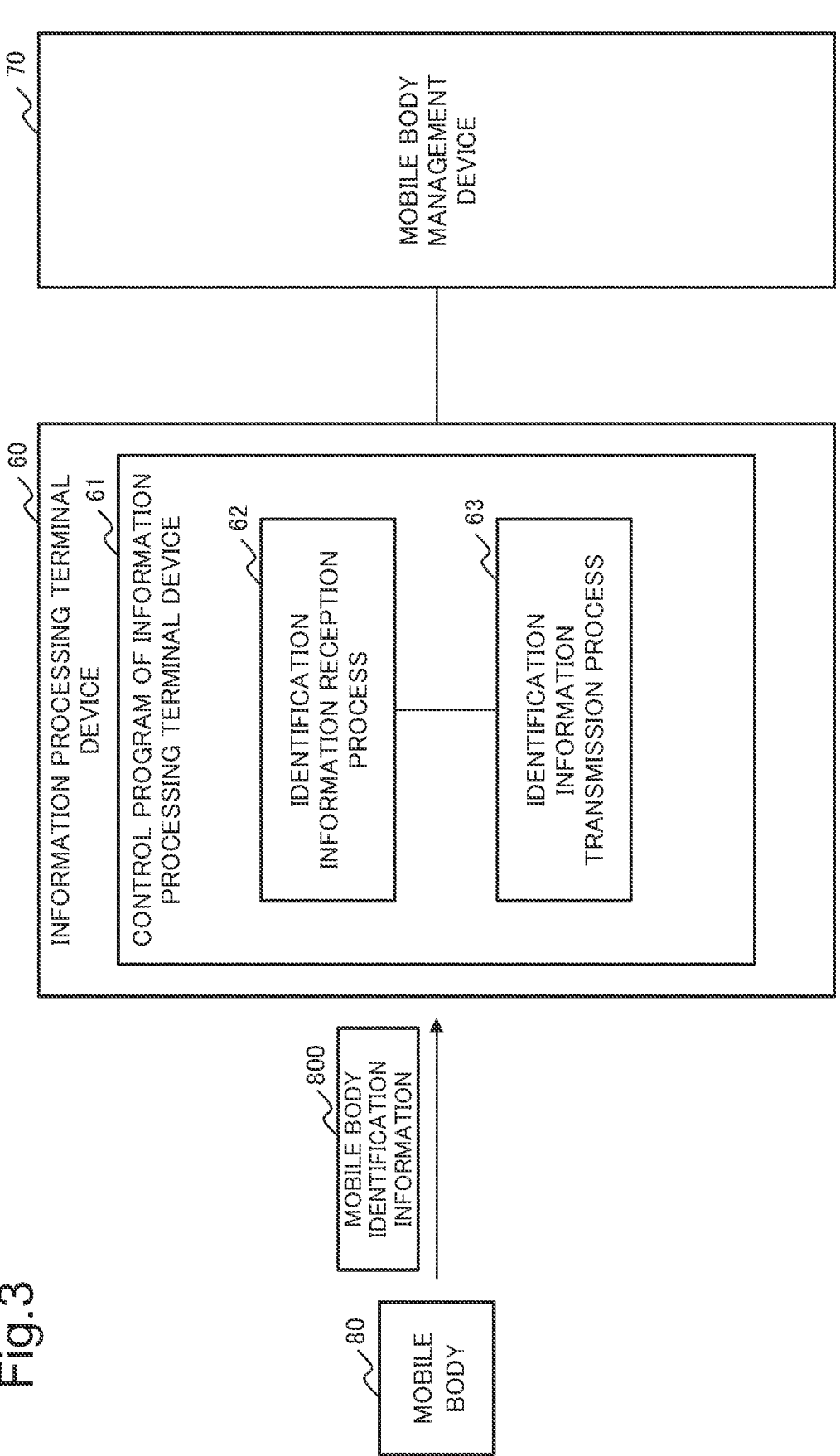
FIG. 3 is a block diagram illustrating a configuration of a control program 61 of an information processing terminal device according to the second example embodiment of the present invention.

FIG. 3 is a block diagram illustrating a configuration of a control program 61 of the information processing terminal device according to the second example embodiment of the present invention. The control program 61 of the information processing terminal device causes an information processing terminal device 60 to execute an identification information reception process 62 and an identification information transmission process 63.

The identification information reception process 62 receives mobile body identification information 800 that is capable of identifying the mobile body 80 and indicates the state of a mobile body 80, the mobile body identification information being transmitted from the mobile body 80. The mobile body 80 is, for example, a moving device such as the drone 50 according to the first example embodiment. The mobile body identification information 800 is, for example, information similar to the remote ID 500 according to the first example embodiment. The identification information reception process 62 operates as in the identification information reception unit 12 of the smartphone 10 according to the first example embodiment, for example.

The identification information transmission process 63 transmits the received mobile body identification information 800 to a mobile body management device 70 that manages the mobile body 80. The mobile body management device 70 is, for example, a device similar to the drone management device 20 according to the first example embodiment. The identification information transmission process 63 operates as in the identification information transmission unit 13 of the smartphone 10 according to the first example embodiment, for example.

The control program 61 of the information processing terminal device according to the present example embodiment can achieve comprehensive grasping of operation statuses of a large number of mobile bodies 80 in various places in order to accurately perform operation management of the mobile body 80. This is because the information processing terminal device 60 receives the mobile body identification information 800 from the mobile body 80 to transmit the mobile body identification information 800 to the mobile body management device 70 by executing the control program 61 of the information processing terminal device.

Hardware Configuration Example

Each unit in the smartphone 10, the drone management device 20 illustrated in FIG. 1, or the information processing terminal device 60 illustrated in FIG. 3 in each of the above-described example embodiments can be achieved by dedicated hardware (HW) (electronic circuit). In FIGS. 1 and 3, at least the following configurations can be regarded as a function (processing) unit (software module) of a software program.
the acquisition unit 11,
the identification information reception unit 12,
the identification information transmission unit 13,
the imaging control function of the imaging unit 14,
the reception unit 21,
the control information generation unit 22,
the control information transmission unit 23,
the learning unit 24,
the reward unit 25,
the trajectory generation unit 26,
the display control unit 27,
the storage control function of the storage unit 28.
The division of each unit illustrated in these drawings is a configuration for convenience of description, and various configurations can be assumed at the time of implementation. An example of a hardware environment in this case will be described with reference to FIG. 4.

Figure 4:
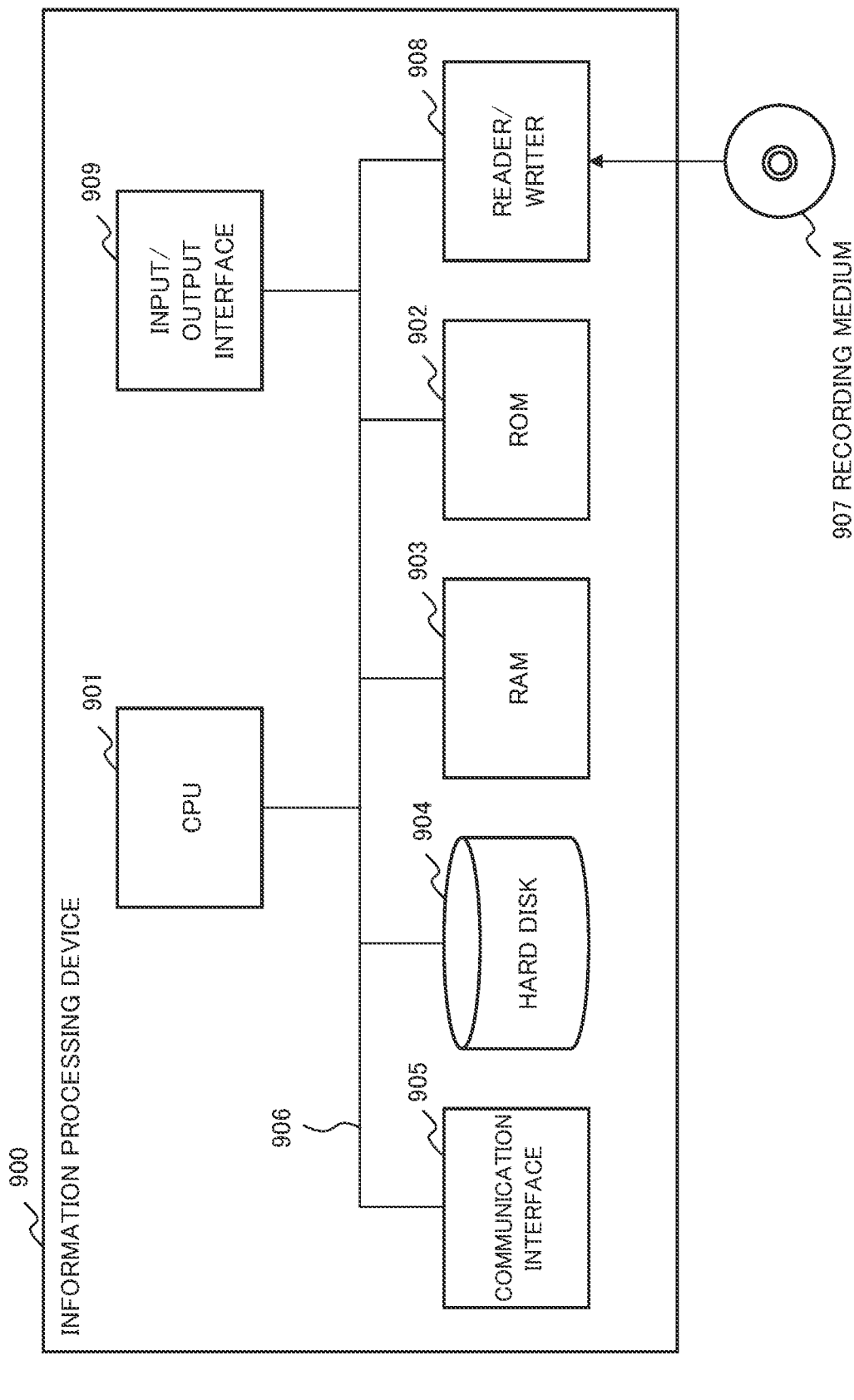
FIG. 4 is a block diagram illustrating a configuration of an information processing device 900 capable of achieving a smartphone 10, a drone management device 20, and an information processing terminal device 60 according to each example embodiment of the present invention.

FIG. 4 is a diagram exemplarily describing a configuration of an information processing device 900 (computer system) capable of achieving the smartphone 10 and the drone management device 20 according to the first example embodiment, or the information processing terminal device 60 according to the second example embodiment of the present invention. That is, FIG. 4 is a configuration of at least one computer (information processing device) capable of achieving each of the above-described devices illustrated in FIGS. 1 and 3, and represents a hardware environment capable of achieving each function in the above-described example embodiment.

The information processing device 900 illustrated in FIG. 4 includes the following components as components, but may not include some of the following components.

a central processing unit (CPU) 901,
a read only memory (ROM) 902,
a random access memory (RAM) 903,
a hard disk (storage device) 904,
a communication interface 905 with an external device,
a bus 906 (communication line),
a reader/writer 908 capable of reading and writing data stored in a recording medium 907 such as a compact disc read only memory (CD-ROM), and
an input/output interface 909 such as a monitor, a speaker, or a keyboard.

That is, the information processing device 900 including the above-described components is a general computer to which these components are connected via the bus 906. The information processing device 900 may include a plurality of CPUs 901 or may include a CPU 901 configured by a plurality of cores. The information processing device 900 may include a Graphical_Processing_Unit (GPU) (not illustrated) in addition to the CPU 901.

Then, the present invention described using the above-described example embodiment as an example supplies a computer program capable of achieving the following functions to the information processing device 900 illustrated in FIG. 4. The function is the above-described configuration in the block configuration diagram (FIGS. 1 and 3) referred to in the description of the example embodiment or the function of the flowchart (FIG. 2). Thereafter, the present invention is achieved by reading, interpreting, and executing the computer program on the CPU 901 of the hardware. The computer program supplied into the device may be stored in a readable/writable volatile memory (RAM 903) or a non-volatile storage device such as the ROM 902 or the hard disk 904.

In the above case, a general procedure can be used at present as a method of supplying the computer program into the hardware. Examples of the procedure include a method of installing the program in the device via various recording media 907 such as a CD-ROM, a method of downloading the program from the outside via a communication line such as the Internet, and the like. In such a case, the present invention can be understood to be configured by a code constituting the computer program or the recording medium 907 storing the code.

The present invention is described above using the above-described example embodiments as exemplary examples. However, the present invention is not limited to the above-described example embodiments. That is, it will be understood by those of ordinary skill in the art that the present invention can have various aspects without departing from the spirit and scope of the present invention as defined by the claims.

REFERENCE SIGNS LIST 1 drone management system
10 smartphone
11 acquisition unit
12 identification information reception unit
13 identification information transmission unit
14 imaging unit
20 drone management device
21 reception unit
22 control information generation unit
23 control information transmission unit 24 learning unit
25 reward unit
26 trajectory generation unit
27 display control unit
28 storage unit
281 application program
282 control information
283 mobile body control standard
30 drone control device
40 display device
50 drone
500 remote ID
60 information processing terminal device
61 control program for information processing terminal device
62 identification information reception process
63 perform identification information transmission process
70 mobile body management device
80 mobile body
800 mobile body identification information
900 information processing device
901 CPU
902 ROM
903 RAM
904 hard disk (storage device)
905 communication interface
906 bus
907 recording medium
908 reader/writer
909 input/output interface

What is claimed is:

1. A non-transitory computer-readable recording medium storing a control program for causing a drone management system to execute:

an identification information reception process of receiving mobile body identification information that is capable of identifying a mobile body and indicates a state of the mobile body, the mobile body identification information being transmitted from the mobile body;

an identification information transmission process of transmitting the received mobile body identification information to a mobile body management device that manages the mobile body by posting the mobile body identification information on a social networking service (SNS); and a control process of controlling a drone control device to transmit control information generated based on the mobile body identification information to control movements of the mobile body.

2. The non-transitory computer-readable recording medium storing the control program for the drone management system device according to claim 1, wherein the mobile body identification information includes information indicating a position of the mobile body and time.

3. The non-transitory computer-readable recording medium storing the control program for the drone management system according to claim 1, wherein the identification information transmission process includes transmitting, to the mobile body management device, a captured image in which the mobile body is imaged by a camera in an information processing terminal device.

4. The non-transitory computer-readable recording medium storing the control program for the drone management system according to claim 1, wherein the mobile body is a drone, and the mobile body identification information is a remote ID.

5. A mobile body management device that receives mobile body identification information, the mobile body management device comprising:

at least one memory storing a computer program; and at least one processor configured to execute the computer program to receive mobile body identification information posted to a social networking service (SNS) by an information processing terminal device;

generate, based on the mobile body identification information related to a plurality of mobile bodies and a mobile body control standard indicating a relationship between the mobile body identification information and control information for suitably controlling movements of the plurality of mobile bodies, the control information related to each of the mobile bodies; and transmit the generated control information to a mobile body control device configured to control movements of the mobile bodies.

6. The mobile body management device according to claim 5, wherein the processor is configured to execute the computer program to generate or update the mobile body control standard by learning a relationship between the mobile body identification information and the control information.

7. The mobile body management device according to claim 5, wherein the processor is configured to execute the computer program to give a reward to a user indicated by user identification information capable of identifying the user of the information processing terminal device, the user identification information being received together with the mobile body identification information from the information processing terminal device.

8. The mobile body management device according to claim 5, wherein the processor is configured to execute the computer program to display a state of the mobile bodies indicated by the mobile body identification information on a display device.

9. The mobile body management device according to claim 5, wherein the processor is configured to execute the computer program to generate a trajectory of a movement of each of the mobile bodies from a temporal transition of the mobile body identification information.

10. The mobile body management device according to claim 9, wherein the processor is configured to execute the computer program to identify a position, of a mobile body in a missing state, indicated by the mobile body identification information received last by the information processing terminal device as a candidate for a location where the mobile body is present.

11. A non-transitory computer-readable recording medium storing a control program for causing a drone management system to execute:

an identification information reception process of receiving mobile body identification information posted to a social networking service (SNS) by an information processing terminal device;

a generation process of generate, based on the mobile body identification information related to a plurality of mobile bodies and a mobile body control standard indicating a relationship between the mobile body identification information and control information for suitably controlling movements of the plurality of mobile bodies, the control information related to each of the mobile bodies; and a control process of transmitting the generated control information to a mobile body control device to control movements of the mobile bodies.

* * * * *